(12) United States Patent
Dorn et al.

(10) Patent No.: US 6,836,880 B1
(45) Date of Patent: Dec. 28, 2004

(54) SOFTWARE COMPONENT AND EXECUTION METHOD FOR SOFTWARE COMPONENT

(75) Inventors: Karlheinz Dorn, Kalchreuth (DE); Stefan Muenzel, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/515,090

(22) Filed: Feb. 29, 2000

(30) Foreign Application Priority Data

Mar. 5, 1999  (DE) .......................................... 199 09 717

(51) Int. Cl.[7] .................................................. G06F 9/44
(52) U.S. Cl. ...................................... 717/120; 717/162
(58) Field of Search ................................ 717/120–127, 717/101–103, 162–167; 719/313, 331

(56) References Cited

U.S. PATENT DOCUMENTS

| | | | | | |
|---|---|---|---|---|---|
| 5,519,866 | A | * | 5/1996 | Lawrence et al. | 717/162 |
| 5,850,548 | A | * | 12/1998 | Williams | 717/107 |
| 5,870,088 | A | * | 2/1999 | Washington et al. | 345/781 |
| 6,093,215 | A | * | 7/2000 | Buxton et al. | 717/107 |
| 6,467,085 | B2 | * | 10/2002 | Larsson | 717/165 |
| 6,499,137 | B1 | * | 12/2002 | Hunt | 717/164 |
| 6,530,075 | B1 | * | 3/2003 | Beadle et al. | 717/114 |

FOREIGN PATENT DOCUMENTS

DE          198 07 191          2/1998

OTHER PUBLICATIONS

Microsoft Press Computer Dictionary. p. 166. p. 339, 1997.*
Fertitta et al. The Role of Activex and COM in ATE. IEEE. 1999. pp. 35–51.*
Horner et al. Configuring Scientific Applications in a Heterogeneous Distributed System. IEEE. 1994. pp. 159–168.*

* cited by examiner

*Primary Examiner*—Wei Y. Zhen
(74) *Attorney, Agent, or Firm*—Schiff Hardin LLP

(57) ABSTRACT

A software component that can be called via a container proceeding from an operating system and that has one or more sub-components. The sub-components have internal interfaces meeting the Microsoft OCX or the Java Beans definition for communication with one another and/or with the software component and have a common container interface for communication of the sub-components with the container. The common container interface meets the Microsoft OCX or the Java Beans definition.

6 Claims, 2 Drawing Sheets

US 6,836,880 B1

SOFTWARE COMPONENT AND EXECUTION METHOD FOR SOFTWARE COMPONENT

BACKGROUND OF THE INVENTION

The present invention relates to a software component that, proceeding from a computer operated under an operating system, can be called via a container and comprises one or more sub-components, and also relates to an execution method for such a software component.

Software components are well known. A software component is a program that is composed of runnable code that comprises an interface to what is referred to as a container.

Containers are also well known. A container is a program that is composed of runnable code and comprises an interface to a software component and an interface to the operating system and can be called directly from the operating system. Moreover, the container executes no domain functions. It thus represents a coupling element between a software component—that, moreover, is arbitrary—and the operating system. It thus enables the running of the software component on the computer.

German Patent Application No. 198 07 191 discloses a program run mechanism and methods for the expansion of a program component system wherein a software component can be called via a container proceeding from a computer operated under an operating system and comprises one or more sub-components.

The development of software components often requires man years. Software components should therefore be optimally simple to produce and modify.

SUMMARY OF THE INVENTION

It is an object of the present invention to provide a software component that is simple to produce and modify and an execution method corresponding to the software component.

This object is achieved in accordance with the present invention in a software component that, proceeding from a computer operated under an operating system, can be called via a container, said software component comprising: at least one sub-component having an internal interface for communicating with other sub-components and with said software component, said internal interface meeting the Microsoft OCX or the Java Beans definition; and a common container interface for communication between said at least one sub-component and said container, said common container interface meeting the Microsoft OCX or the Java Beans definition.

The software component comprises sub-components having internal interfaces for communication with one another and/or with the software component, and a common container interface (generic interface) for the communication of the sub-components with the container, wherein the interfaces meet the Microsoft OCX or the Java Beans definition.

This object is also achieved in accordance with the present invention in an execution method for a software component that can be called via a container proceeding from a computer operated under an operating system and that comprises at least one sub-component, said method comprising the steps of: ensuing communication between said at least one sub-component and other sub-components and between said at least one sub-component and said software component via internal interfaces, said internal interfaces meeting the Microsoft OCX or the Java Beans definition; and ensuing communication between said at least one sub-component and said container via a common container interface, said common container interface meeting the Microsoft OCX or the Java Beans definition.

When the software component comprises an extension interface for the communication with an extension component, i.e. the software component communicates with the extension component via an extension interface, it is possible to expand the functionality of the software component without modifying the software component itself. The software component can thus be dynamically extended for the runtime by the extension component. The extension component can thereby be arranged inside or outside the software component.

The production of the extension component is especially easy when the extension interface also meets the Microsoft OCX or the Java Beans definition.

The extension component can, for example, be fashioned as dynamic link library.

These and other features of the invention(s) will become clearer with reference to the following detailed description of the presently preferred embodiments and accompanied drawings.

DETAILED DESCRIPTION OF THE PRESENTLY PREFERRED EMBODIMENTS

Figure 1:
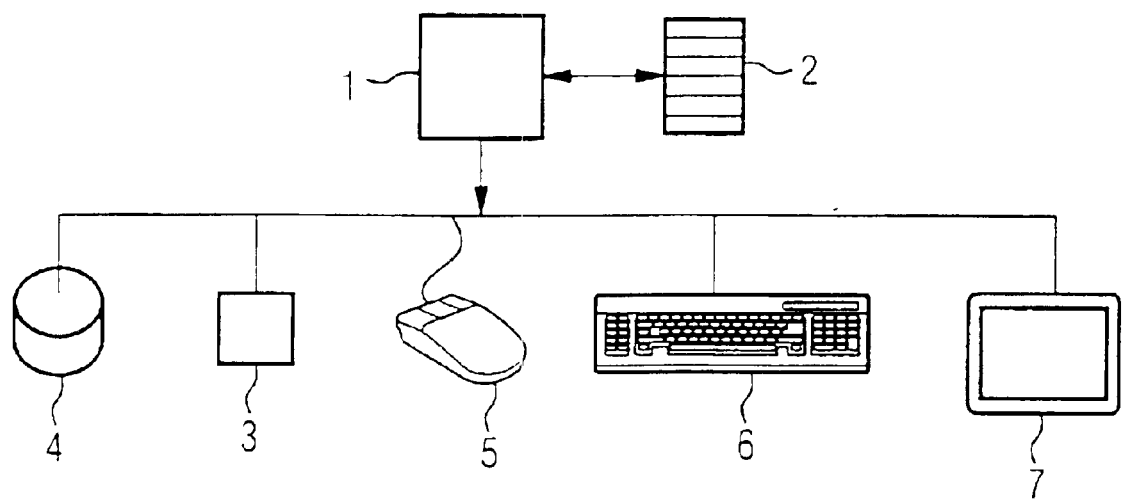
FIG. 1 is a block diagram of a computer.

According to FIG. 1, a computer comprises at least one processor 1 and a number of registers 2. The processor 1 can access a main memory 3 and a bulk storage 4 via a bus system. A user can communicate commands to the processor 1 via a keyboard 6 and a mouse 5. The processor 1 then executes an application program 9 according to the commands and presents the result on a monitor 7.

Figure 2:
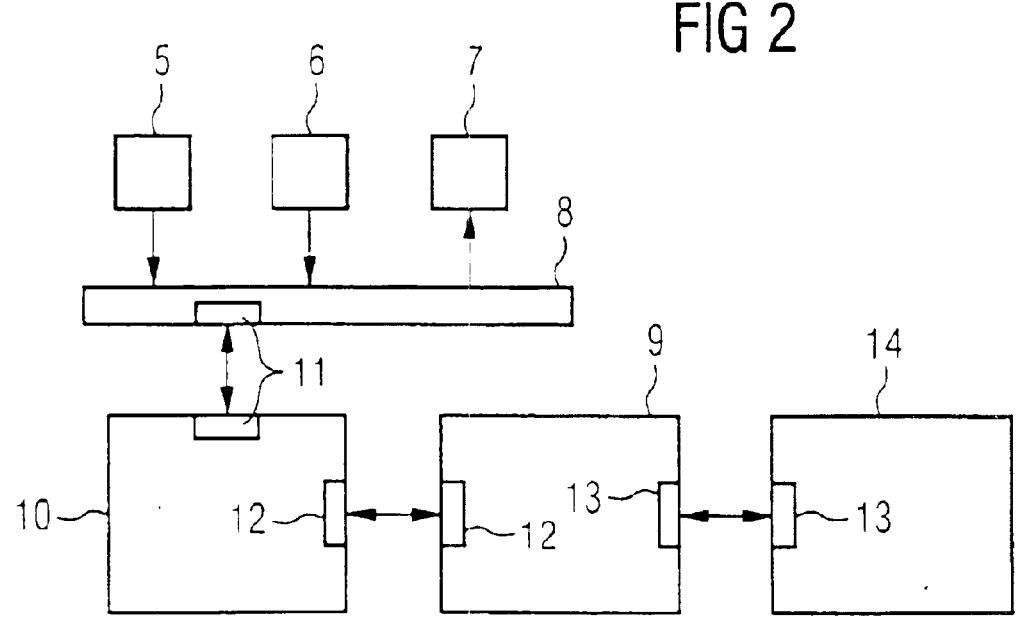
FIG. 2 is a block diagram of a software hierarchy.

According to FIG. 2, the interaction of a user with the application program 9 ensues via an operating system 8, for example Windows. The operating system 8 permanently queries the inputs that have ensued via the keyboard 6 and the mouse 5 and communicates these to the application program 9. Picture screen outputs are also usually not directly driven by the application program 9 but ensue indirectly via the operating system 8.

According to FIG. 2, the application program 9 is fashioned as a software component (macro component). Accordingly, it can be called via a container 10 proceeding from the operating system 8. To this end, the operating system 8 and the container 10 comprise interfaces 11 corresponding with one another.

Further, the container 10 and the application program 9 also comprise interfaces 12 corresponding with one another via which they communicate with one another. The interface 12 of the application program 9 with the container 10, what is referred to as the container interface 12, is thus fashioned as a generic interface. The communication between the application program 9 and the container 10 thus ensues via the container interface 12. Otherwise, the container 10 merely represents a runnable environment for the application program 9.

According to FIG. 2, the application program 9 comprises a further interface 13 (extension interface 13) with which the application program 9 can communicate with an extension component 14 outside the software component 9. In an embodiment, the extension component 14 is arranged outside the software component 9. However, the extension component 14 could also be arranged inside the software component 9.

Basically, the interfaces 12, 13 between the container 10 and the application program 9 or between the application program 9 and the extension component 14 can be arbitrarily fashioned. The fashioning of the interfaces 12, 13 is especially simple, however, when they meet the Microsoft OCX or the Java Beans definition.

The application-specific content of the application program 9 or of the macro component 9 is also of a fundamentally arbitrary nature. In an embodiment, the application program 9 contains image processing software.

Figure 3:
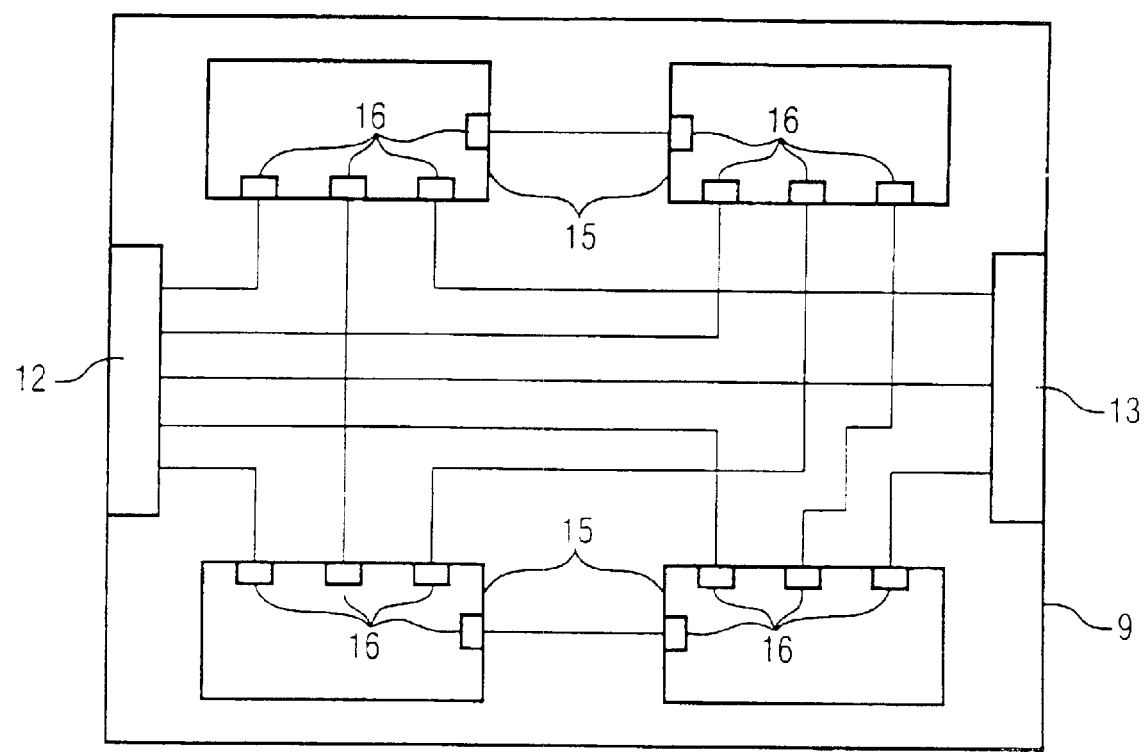
FIG. 3 is a block diagram of a software component.

According to FIG. 3, the application program 9 or the software component 9 (macro component) comprises a number of sub-components 15. The sub-components 15 comprise internal interfaces 16 for communication with one another, with the software component 9 and the extension component 14. The internal interfaces 16 can likewise be basically arbitrarily fashioned. However, the fashioning of the internal interfaces 16 is especially simple when they likewise meet the Microsoft OCX or the Java Beans definition. The communication of the sub-components 15 with one another, with the container interface 12, and with the interface 13 of the application program 9 to the extension component 14 then ensues via these internal interfaces 16. The container interface 12 and the interface 13 of the application program 9 to the extension component 14 are thus shared by all sub-components 15.

The sub-components 15 cannot be directly called from the operating system 8, namely neither directly from the operating system 8 nor via a container. They can only be called via the software component 9.

The extension component 14 is preferably fashioned just like the software component 9. Alternatively or additionally, it can also be fashioned as a dynamic link library.

The advantage of the inventive, interleaved component software is comprised therein that the components 9, 14, 15 meet a language-neutral interface standard. They can thus be produced in various programming languages. Further, the interfaces 11 through 13 and 16 can be produced with what are referred to as external script languages that are of fundamental significance for the production of what are referred to as business object models.

Although modifications and changes may be suggested by those of ordinary skill in the art, it is the intention of the inventors to embody within the patent warranted hereon all changes and modifications as reasonably and properly come within the scope of their contribution to the art.

We claim:

1. An execution method for a software component that can be called via a container proceeding from a computer operated under an operating system and that comprises at least one sub-component, said method comprising the steps of:

ensuing communication between said at least one sub-component and other sub-components and between said at least one subcomponent and said software component via internal interfaces;

ensuing communication between said at least one sub-component and said container via a common container interface;

ensuing communication between said software component and an extension component via a runtime dynamic extension interface; and ensuing communication between said operating system and said software component via interfaces that are runtime dynamic.

2. The execution method according to claim 1, wherein said extension component is a dynamic link library.

3. The execution method according to claim 1 wherein said subcomponents can only be called via said software component.

4. A software component that, proceeding from a computer operated under an operating system, can be called via a container, said software component comprising:

at least one sub-component having an internal interface for communicating with other sub-components and with said software component;

a common container interface for communication between said at least one sub-component and said container; and a runtime dynamic extension interface for communication between said software component and an extension component outside of said software component.

5. The software component according to claim 4, wherein said extension component is a dynamic link library.

6. The software component to claim 4, wherein said at least one sub-component can only be called via said software component.

* * * * *